(12) United States Patent  (10) Patent No.: US 7,743,054 B2
Sasai  (45) Date of Patent: Jun. 22, 2010

(54) INFORMATION RETRIEVAL SYSTEM

(75) Inventor: Kosuke Sasai, Kobe (JP)

(73) Assignee: Konica Minolta Holdings, Inc., Tokyo (JP)

( * ) Notice: Subject to any disclaimer, the term of this patent is extended or adjusted under 35 U.S.C. 154(b) by 261 days.

(21) Appl. No.: 11/115,565

(22) Filed: Apr. 27, 2005

(65) Prior Publication Data

US 2005/0240579 A1  Oct. 27, 2005

(30) Foreign Application Priority Data

Apr. 27, 2004 (JP) .............................. 2004-131227

(51) Int. Cl.
*G06F 7/00* (2006.01)
*G06F 17/30* (2006.01)
(52) U.S. Cl. ..................... 707/721; 707/751; 707/768; 707/E17.062; 707/E17.082; 707/999.003
(58) Field of Classification Search ..................... 707/3, 707/10, E17.062, E17.082; 709/202
See application file for complete search history.

(56) References Cited

U.S. PATENT DOCUMENTS 5,761,662 A * 6/1998 Dasan ......................... 707/10

6,289,337 B1 * 9/2001 Davies et al. .................. 707/3
2003/0050959 A1 * 3/2003 Faybishenko et al. ........ 709/202
2003/0212673 A1 * 11/2003 Kadayam et al. ............... 707/3

FOREIGN PATENT DOCUMENTS

| JP | 08-063481 | 3/1996 |
| JP | 08-115334 | 5/1996 |
| JP | 09-245058 | 9/1997 |

* cited by examiner

*Primary Examiner*—Khanh B Pham
*Assistant Examiner*—Ann J Chempakaseril
(74) *Attorney, Agent, or Firm*—Brinks Hofer Gilson & Lion

(57) ABSTRACT

An information retrieval system has a search history storage for storing information of the relation between a search condition entered by the user and selected paper data. In the search history storage, information of the relation between the search condition and a detailed search condition is also stored. The selected paper information and the detailed search information is updated on the basis of a screen transition instruction. The selected paper information is used for a searching process in a search engine and a screen generating process in an HTML document generator.

14 Claims, 19 Drawing Sheets

FIG. 1

DEVELOPMENT OF ELECTRONIC PATIENT RECORD SYSTEM
FOR SPECIAL MEDICAL CARE

ICHIRO TANAKA

ABSTRACT: THE ELECTRONIC PATIENT RECORD SYSTEM ...

Abstract:The electronic Patient Record system···

1. PREFACE
AS COMPARED WITH GENERAL MEDICAL CARE, ...

2. DEVELOPMENT OF ELECTRONIC PATIENT RECORD SYSTEM FOR SPECIAL MEDICAL CARE
I STARTED DEVELOPMENT OF ...

3. DEVELOPED ELECTRONIC PATIENT RECORD SYSTEM
THE DEVELOPED ELECTRONIC PATIENT RECORD SYSTEM IS ...

4. CONCLUSION
THE SYSTEM WHICH USES THE INTERNET AS FRAMEWORK AND
DOES NOT DEPEND ON AN OS ...

PROCEEDINGS OF XYZ SOCIETY

```
<?xml version='1.0' encoding='utf-8'?><rdf:RDF
 xmlns:dcterms="http://abc.org/dc/terms/"
 xmlns:xyz="http://www.company/material/RDF/1.0/schema/propety/jcmi#"
 xmlns:rdf="http://www.w3.org/1999/02/22-rdf-syntax-ns#"
 xmlns:dc="http://abc.org/dc/elements/1.1/">
<rdf:Description rdf:about="http://www.company.co.jp/jcmi/paper/1075365977327" xyz:id="1075365977327">
  <dc:publisher>
    <rdf:Alt>
      <rdf:li xml:lang="ja">XYZ SOCIETY PROCEEDINGS</rdf:li>
    </rdf:Alt>
  </dc:publisher>
  <dcterms:abstract>
    <rdf:Alt>
      <rdf:li xml:lang="ja">ABSTRACT: THE ELECTRONIC PATIENT RECORD SYSTEM ...</rdf:li>
      <rdf:li xml:lang="en">Abstract:The electronic Patient Record System・・.</rdf:li>
    </rdf:Alt>
  </dcterms:abstract>
  <dc:title>
    <rdf:Alt>
      <rdf:li xml:lang="ja">DEVELOPMENT OF ELECTRONIC PATIENT RECORD SYSTEM FOR SPECIAL MEDICAL CARE</rdf:li>
    </rdf:Alt>
  </dc:title>
  <xyz:keywords>Electronic Patient Record</xyz:keywords>
  <xyz:structure rdf:parseType="Resource">
    <xyz:paragraph rdf:parseType="Resource">
      <dc:title1 xml:lang="ja">1．PREFACE</dc:title>
      <xyz:content>AS COMPARED WITH GENERAL MEDICAL CARE, ...</xyz:content>
    </xyz:paragraph>A
```

```
<xyz:paragraph rdf:parseType="Resource">
  <dc:title xml:lang="ja">2．DEVELOPMENT OF ELECTRONIC PATIENT RECORD SYSTEM FOR SPECIAL MEDICAL CARE</dc:title>
  <xyz:content>I STARTED DEVELOPMENT OF …</xyz:content>
</xyz:paragraph>
<xyz:paragraph rdf:parseType="Resource">
  <dc:title xml:lang="ja">3．DEVELOPED ELECTRONIC PATIENT RECORD SYSTEM</dc:title>
  <xyz:content>DEVELOPED ELECTRONIC PATIENT RECORD SYSTEM…</xyz:content>
</xyz:paragraph>
<xyz:paragraph rdf:parseType="Resource">
  <dc:title xml:lang="ja">4．CONCLUSION</dc:title>
  <xyz:content>THE SYSTEM WHICH USES THE INTERNET AS FRAMEWORK AND DOES NOT DEPEND ON AN OS …</xyz:content>
</xyz:paragraph>
</xyz:structure>
<xyz:author>
<rdf:Description rdf:about="http://www.company.co.jp/jcmi/person/1075365978295" dc:identifier="1075365978295">
  <rdf:Alt>
    <rdf:li xml:lang="ja">ICHIRO TANAKA</rdf:li>
  </rdf:Alt>
</rdf:Description>
</xyz:author>
</rdf:Description>
</rdf:RDF>
```

F I G . 4
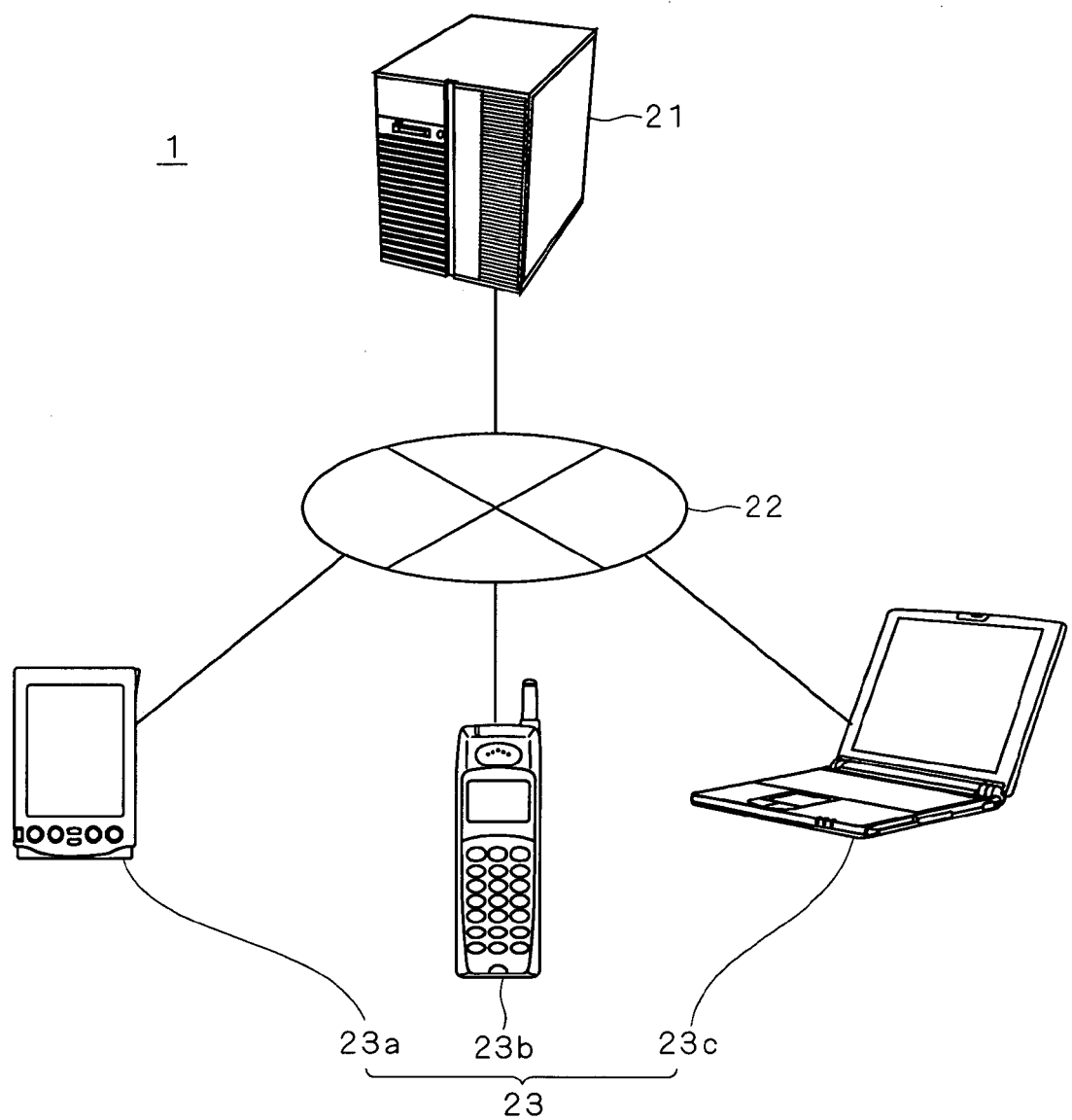

FIG. 8

FULL TEXT + RANGE DESIGNATION    FULL TEXT   RANGE DESIGNATION
CE11                              BT11        BT12

| TITLE | COINCIDENCE | SEARCHING METHOD |
|---|---|---|
| FOR SPECIAL MEDICAL CARE ... | 1.61 | FULL-TEXT SEARCH RANGE-DESIGNATED SEARCH |
| INTRODUCTION OF ELECTRONIC PATIENT RECORD ... | 1.60 | FULL-TEXT SEARCH RANGE-DESIGNATED SEARCH |
| ELECTRONIC MEDICAL ... | 1.59 | FULL-TEXT SEARCH |
| ... | ... | |
| ... | ... | |

DEVELOPMENT OF ELECTRONIC PATIENT RECORD
SYSTEM FOR SPECIAL MEDICAL CARE

ICHIRO TANAKA

ABSTRACT: THE ELECTRONIC PATIENT RECORD SYSTEM ‥‥•

Abstract:The electronic Patient Record system‥‥•

1. PREFACE
   AS COMPARED WITH GENERAL MEDICAL CARE, ‥‥

2. DEVELOPMENT OF ELECTRONIC PATIENT RECORD SYSTEM FOR SPECIAL
   MEDICAL CARE
   I STARTED DEVELOPMENT OF ‥‥

3. DEVELOPED ELECTRONIC PATIENT RECORD SYSTEM
   THE DEVELOPED ELECTRONIC PATIENT RECORD SYSTEM IS ‥‥

4. CONCLUSION
   THE SYSTEM WHICH USES THE INTERNET AS FRAMEWORK
   AND DOES NOT DEPEND ON AN OS ‥‥

XYZ SOCIETY PROCEEDINGS

FIG. 17

| SEARCH CONDITION | SELECTED PAPER DATA | SCORE |
|---|---|---|
| X1 | Y1 | 0.1 |
| ... | ... | ... |
| Xi | Yi | 0.4+δ |
| ... | ... | ... |
| Xn | Yn | 0.2 |

TA62

↑ SEARCH CONDITION Xi SELECTED PAPER DATA Yi

TA61

| SEARCH CONDITION | SELECTED PAPER DATA | SCORE |
|---|---|---|
| X1 | Y1 | 0.1 |
| ... | ... | ... |
| Xi | Yi | 0.4 |
| ... | ... | ... |
| Xn | Yn | 0.2 |

→ SEARCH CONDITION Xn+1 SELECTED PAPER DATA Yn+1

TA63

| SEARCH CONDITION | SELECTED PAPER DATA | SCORE |
|---|---|---|
| X1 | Y1 | 0.1 |
| ... | ... | ... |
| Xi | Yi | 0.4 |
| ... | ... | ... |
| Xn | Ym | 0.2 |
| Xn+1 | Yn+1 | δ |

FIG. 18A

| SEARCH CONDITION | KEYWORD |
|---|---|
| X1 | KW1 |
| ⋮ | ⋮ |
| Xi | KWi |
| ⋮ | ⋮ |
| Xm | KWn |

| SEARCH CONDITION | AUTHOR |
|---|---|
| X1 | AU1 |
| ⋮ | ⋮ |
| Xj | AUj |
| ⋮ | ⋮ |
| Xn | AUn |

TA72

INFORMATION RETRIEVAL SYSTEM

This application is based on application No. 2004-131227 filed in Japan, the contents of which are hereby incorporated by reference.

BACKGROUND OF THE INVENTION

1. Field of the Invention

The present invention relates to an information retrieval system

2. Description of the Background Art

Hitherto, an attempt is made to improve retrieval precision and retrieval efficiency by using past operations of the user related to a search in an information retrieval system.

For example, Japanese Patent Application Laid-Open No. 8-63481 (1996) discloses a technique of changing the display order of keywords in accordance with the number of use in past search. Japanese Patent Application Laid-Open No. 8-115334 (1996) discloses a technique of changing the display order of retrieval results by keywords in accordance with the number of times of using the keyword in past retrieval. Japanese Patent Application Laid-Open No. 9-245058 (1997) discloses a technique of updating a keyword network in accordance with a keyword adoption history in past search and changing candidates of keywords to be presented to the user on the basis of the updating.

According to the techniques disclosed in the publications, although operations in the past of the user on a keyword can be reflected in a searching process and display of a search result, the intention (satisfaction level) of the user with respect to a search result is not considered. Consequently, the techniques cannot make the intention of the user with respect to a search result properly reflected in a searching process and display of a search result.

SUMMARY OF THE INVENTION

The present invention is directed to an information retrieval system.

According to the present invention, an information retrieval system includes: a searching part which executes a searching process of extracting a matched data group satisfying a search condition from a data group to be searched; a screen generator which executes a screen generating process of generating a list display screen for displaying a list of information of a first match data group extracted by the searching process using, as the search condition, a first search condition entered by the user and a plurality of selection display screen groups displaying information including detailed information of data selected by a user from the first match data group and displaying the screens; and a storage for storing first relation information as information of the relation between the first search condition and the selected data. The information retrieval system switches a screen to be displayed on the display among the list display screen and the plurality of selection display screen groups in response to a screen transition instruction given from the user, and updates the first relation information on the basis of the screen transition instruction.

Since the screen transition instruction as expression of the user's intention to a search result is reflected in the first relation information, the expression of the intention of the user in the past can be used.

Preferably, the plurality of selection display screen groups include a first selection display screen for displaying first information included in the selected data, and a second selection display screen for displaying second information which is detailed more than the first information, included in the selected data, and the information retrieval system changes a screen to be displayed on the display from the first selection display screen to the second selection display screen in response to a predetermined first screen transition instruction.

Since information displayed on the display changes according to a screen transition instruction, the intention of the user can be estimated from the screen transition instruction.

Preferably, the screen generator can also generate a detailed search screen for making the user select a second search condition for a detailed search from options, and the information retrieval system changes a screen to be displayed on the display from a predetermined selection display screen included in the selection display screen group to the detailed search screen in response to a predetermined second screen transition instruction, and extracts the option from information displayed on the predetermined selection display screen.

Since it becomes easy to input information displayed on a predetermined selection display screen as the second search condition to the information retrieval system, information related to selected data can be easily obtained.

Preferably, the first relation information stored in the storage is used for the searching process or the screen generating process.

Since the first relation information is reflected in the searching process and the screen generating process, the expression of the intention of the user is reflected in the searching process and the screen generating process.

Preferably, information displayed on the list display screen or a displaying method changes by the use of the first relation information in the searching process or the screen generating process.

Since the intention of the user is reflected in the information displayed on the list display screen or the displaying method, selection of selected data by the user is facilitated.

Preferably, the storage is provided for each user or each user group.

Since the first relation information can be stored in each user or each user group, the intention of each user or each user group can be reflected in the searching process and the screen generating process.

Preferably, the storage stores second relation information as information of the relation between the first search condition and the second search condition, the screen generator can also generate a detailed search result display screen for displaying information of a second match data group extracted by the searching process using, as the search condition, the second search condition selected by the user on the detailed search screen, and the information retrieval system updates the second relation information on the basis of a predetermined second screen transition instruction in the detailed search result display screen.

Since the screen transition instruction as expression of the user's intention is reflected in the second relation information stored in the storage, the expression of the user's intention in the past can be used.

Preferably, information which can be selected as the second search condition is an author or a keyword of the selected data.

Since the relation between the first search condition and an author or keyword can be specified, when a new first search condition is given, information of an author or keyword having a strong relation to the first search condition can be used.

Therefore, an object of the present invention is to provide an information retrieval system capable of making the intention of the user to a search result properly reflected in display of a search result.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram illustrating a paper P2;

FIG. 2 is a diagram illustrating an XML document X2 obtained by converting the paper P2 into an electronic form;

FIG. 3 is a diagram illustrating the XML document X2 obtained by converting the paper P2 into an electronic form;

FIG. 4 is a diagram showing the hardware configuration of an information retrieval system 1;

FIG. 8 is a diagram illustrating a list display screen 202;

FIG. 10 is a diagram illustrating a full-text individual display screen 204;

FIG. 17 is a diagram showing a method of updating selected paper information;

FIGS. 18A and 18B are diagrams showing detailed search information; and

DESCRIPTION OF THE PREFERRED EMBODIMENTS

Figure 5:
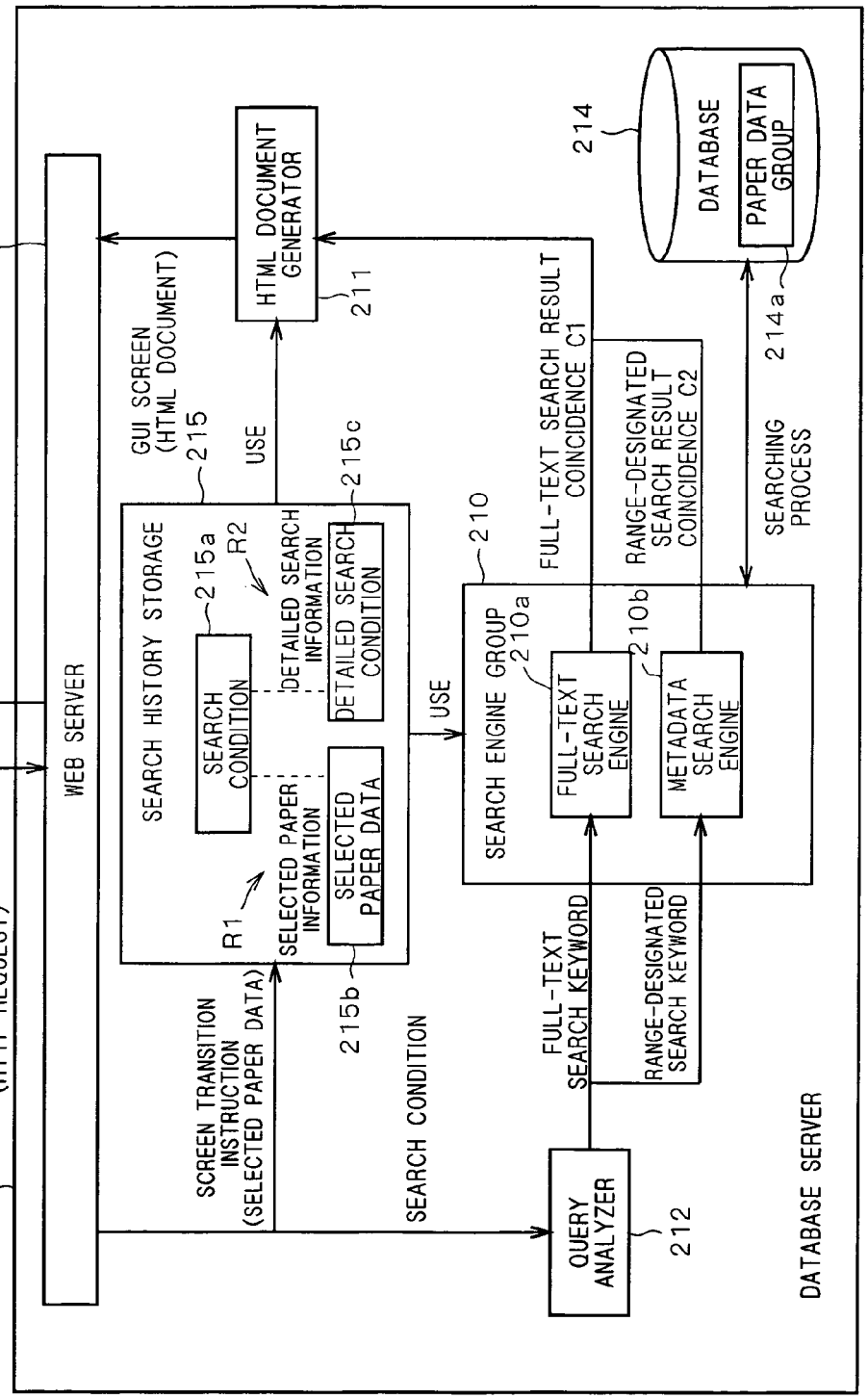
FIG. 5 is a block diagram showing a functional configuration of a database server 21 in the information retrieval system 1.

An information retrieval system 1 of a preferred embodiment executes a process for searching a data group to be searched to extract an adapted data group adapted to a search condition from the data group to be searched, and presents the extracted data group to the user. There is no limit to the data group to be searched. Therefore, in the information retrieval system 1, a data group obtained by converting information in the academic field, industrial field, and living field into an electronic form can be employed as the data group to be searched. Examples of information in the academic field are a technical report, an academic paper, and patent information. Examples of information in the industrial field are commodity information and shop information. Examples of information in the living field are local information and food information. The following description will be given on assumption that the data group to be searched is a paper data group obtained by converting papers in the medical field into an electronic form. The paper data group is an example and does not limit the object to which the information retrieval system 1 is applied.

The information retrieval system 1 executes a process of searching the data group to be searched and uses intentions in the past of the user indicated to a search result to improve the satisfaction level of the user on the search result. The satisfaction level includes here pertinence and usefulness depending on the user out of relevance, pertinence, and usefulness as main indicators related to effectiveness of a search result.

Each piece of paper data constructing the paper data group is an XML (eXtensible Markup Language) obtained by converting a paper into an electronic form. FIG. 1 is a diagram illustrating a paper P2 as a document in a fixed form including predetermined items. FIGS. 2 and 3 are diagrams illustrating XML documents X2 obtained by converting the paper P2 of FIG. 1 into an electronic form. In the XML document X2, expression according to the RDF (Resource Description Framework) is employed.

The head part X21 of the XML document X2 includes XML declaration and name space prefix declaration. The XML document X2 has elements E21 to E26 for describing information of publisher, abstract, title, keyword, text, and author. The element 25 includes, as child elements, elements E251 to E254 for describing contents of paragraphs of the text. The elements E251 to E254 include, as child elements, elements E251t to E254t for describing titles of the paragraphs and elements E251c to E254c for describing the contents of the paragraphs, respectively.

Configuration

Hardware Configuration

FIG. 4 is a diagram showing a hardware configuration of the information retrieval system 1.

The information retrieval system 1 has a database server 21. In the database server 21, a Web server is also implemented. Consequently, the database server 21 can provide database service for a network 22. Obviously, a Web server may be implemented on a host physically apart from the database server 21. The network 22 to which the database service is provided may be any of an intranet and the Internet.

The database service provided for the network 22 can be used by a client 23 connected to the network 22. The client 23 includes, for example, a portable information terminal 23a, a cellular phone 23b, and a computer 23c. A Web browser is implemented on the client 23. In the information retrieval system 1, transmission of a search condition from the client 23 to the database server 21 is performed by an HTTP request transmitted from the Web browser to the database server 21. In the information retrieval system 1, transmission of a search result from the database server 21 to the client 23 is performed by an HTTP response which is transmitted from the database server 21 to the Web browser.

Functional Configuration

Figure 6:
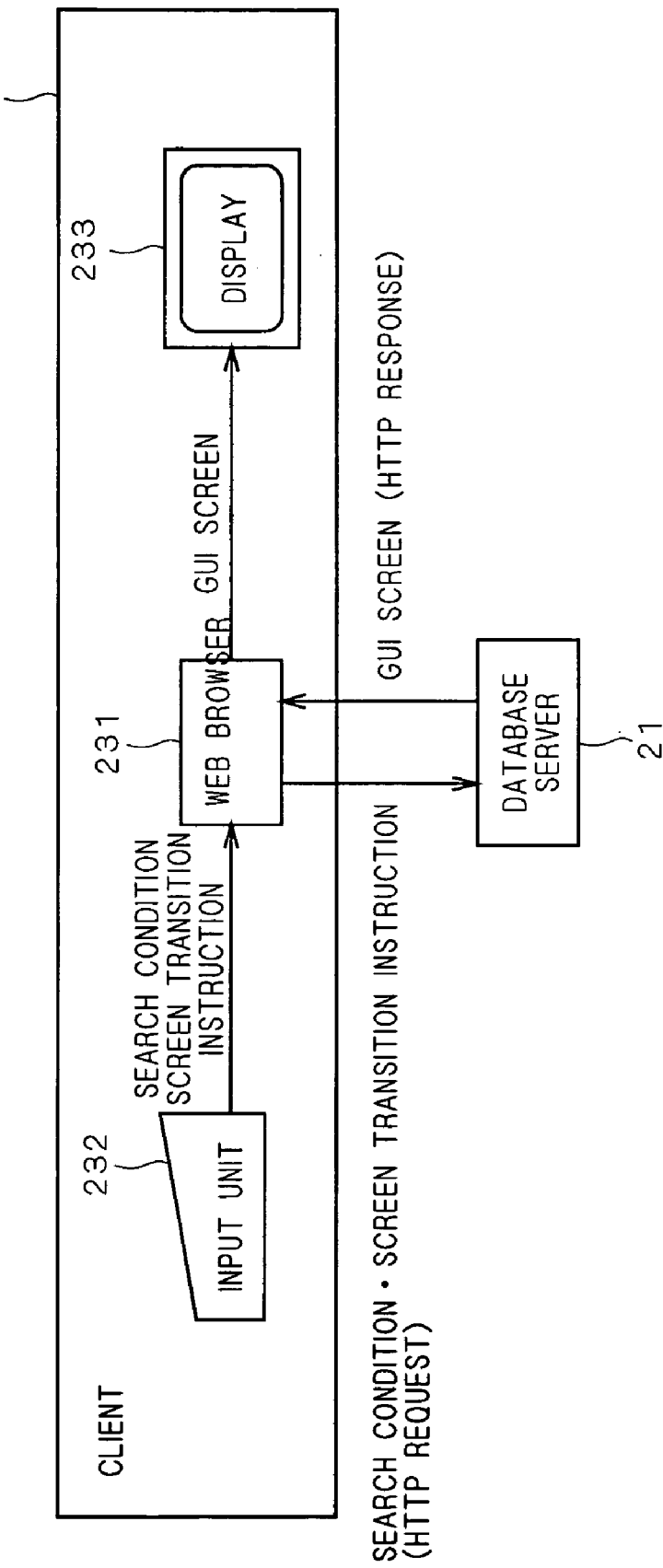
FIG. 6 is a block diagram showing a functional configuration of a client 23 in the information retrieval system 1.

FIG. 5 is a block diagram showing a functional configuration of the database server 21 of the information retrieval system 1. FIG. 6 is a block diagram showing a functional configuration of the client 23 of the information retrieval system 1.

The database server 21 has functional blocks of a search engine group 210, an HTML (Hyper Text Markup Language) document generator 211, a query analyzer 212, a Web server 213, and the like. The functional blocks are expression of functions realized by execution of a program by a computer in the database server 21.

The search engine group 210 executes a process for searching a paper data group 214*a* stored in a database 214 by using a search keyword input from the query analyzer 212. The search engine group 210 has a full-text search engine 210*a* and a metadata search engine 210*b*.

The full-text search engine 210*a* searches full text of paper data (the whole elements of the XML document X2). The full-text search engine 210*a* executes a process of searching the paper data group 214*a* by using an input search keyword (hereinafter, also referred to as "full-text search keyword") and outputs information of an adapted (matched) paper data group adapted to the full-text search keyword as a search result (hereinafter, also referred to as "full-text search result") to the HTML document generator 211. Further, the full-text search engine 210*a* also calculates coincidence C1 as an indicator of adaptability between the adapted paper data and the full-text search keyword, and outputs it to the HTML document generator 211. The coincidence C1 is determined on the basis of a TF*IDF value as the product between a term frequency TF and an inverse document frequency IDF.

The metadata search engine 210*b* searches a paper data designation range (data of designated elements of the XML document X2). The metadata search engine 210*b* executes a process of searching the paper data group 214*a* by using the input search keyword (hereinafter, also referred to as "range designation search keyword"), and outputs information of an adapted (matched) paper data group adapted to the range designation search keyword (hereinafter, also referred to as "range designation search result") to the HTML document generator 211. The metadata search engine 210*b* calculates coincidence C2 as an indicator of adaptability between the adapted paper data and the range designation search keyword, and outputs it to the HTML document generator 211.

The Web server 213 transfers a search condition received as an HTTP request from the client 23 to the query analyzer 212. The Web server 213 sends back an HTML document generated by the HTML document generator 211 as an HTTP response to the client 23 in response to the HTTP request.

The query analyzer 212 extracts a search key from the search condition transferred from the Web server 213, and outputs it to the full-text search engine 210*a* and the metadata search engine 210*b*. The query analyzer 212 changes a search keyword on the basis of the search characteristics of the search engine at the destination. Concretely, the query analyzer 212 outputs a full-text search keyword to the full-search engine 210*a*, and outputs a designation range search keyword to the metadata search engine 210*b*. By the query analyzer 212 and the search engine group 210, the adapted paper data group can be extracted from the paper data group by using a search condition.

The HTML document generator 211 generates and outputs a GUI (Graphical User Interface) as a medium for inputting/outputting information from/to the user. The GUI screen is a Web page described in HTML or the like. Further, the HTML document generator 211 outputs the generated GUI screen to the client 23 having a display 233 via the Web server 213 to display the GUI screen on the display 233. A concrete example of the GUI screen will be described later. By the HTML document generator 211, the information retrieval system 1 can output a search result obtained by a searching process using a search condition to the client 23 (display 233).

Further, the information retrieval system 1 has a search history storage 215 for storing information (hereinafter, also referred to as "selected paper information") R1 indicative of the relation between a search condition 215*a* entered by the user and selected paper data 215*b* (which will be described later). In the search history storage 215, information (hereinafter, also referred to as "detailed search information") R2 indicative of the relation between the search condition 215*a* and a detailed search condition (which will be described later) 215*c* is also stored. The selected paper information R1 and the detailed search information R2 is updated on the basis of a screen transition instruction (which will be described later). The selected paper information R1 is used for a searching process in the search engine 210 and a screen generating process in the HTML document generator 211.

A Web browser 231 implemented on the client 23 converts the search condition entered by the user with an input unit 232 into an HTTP request in a predetermined method and transmits the HTTP request to the database server 21. The input unit 232 includes input devices such as a keyboard and a pointing device. The input unit 232 is also used for various GUI operations on a GUI screen. The Web browser 231 renders an HTML document sent back as an HTTP response from the database server 21 so that the HTML document is displayed as a GUI screen which can be visually seen.

GUI Screen

The HTML document generator 211 generates GUI screens such as a search screen, a list display screen, a detailed information selection display screen, a full-text selection display screen, a detailed search screen, a detailed search result display screen, a co-author relation display screen, and a popup screen. A screen output from the HTML document generator 211, that is, a screen displayed on the display 233 is switched in response to a screen transition instruction given from the user. In the information retrieval system 1, the screen transition instruction is given by an HTTP request transmitted from the Web browser 231 to the Web server 213. In the following, transition between the GUI screens will be described.

Search Screen

Figure 7:
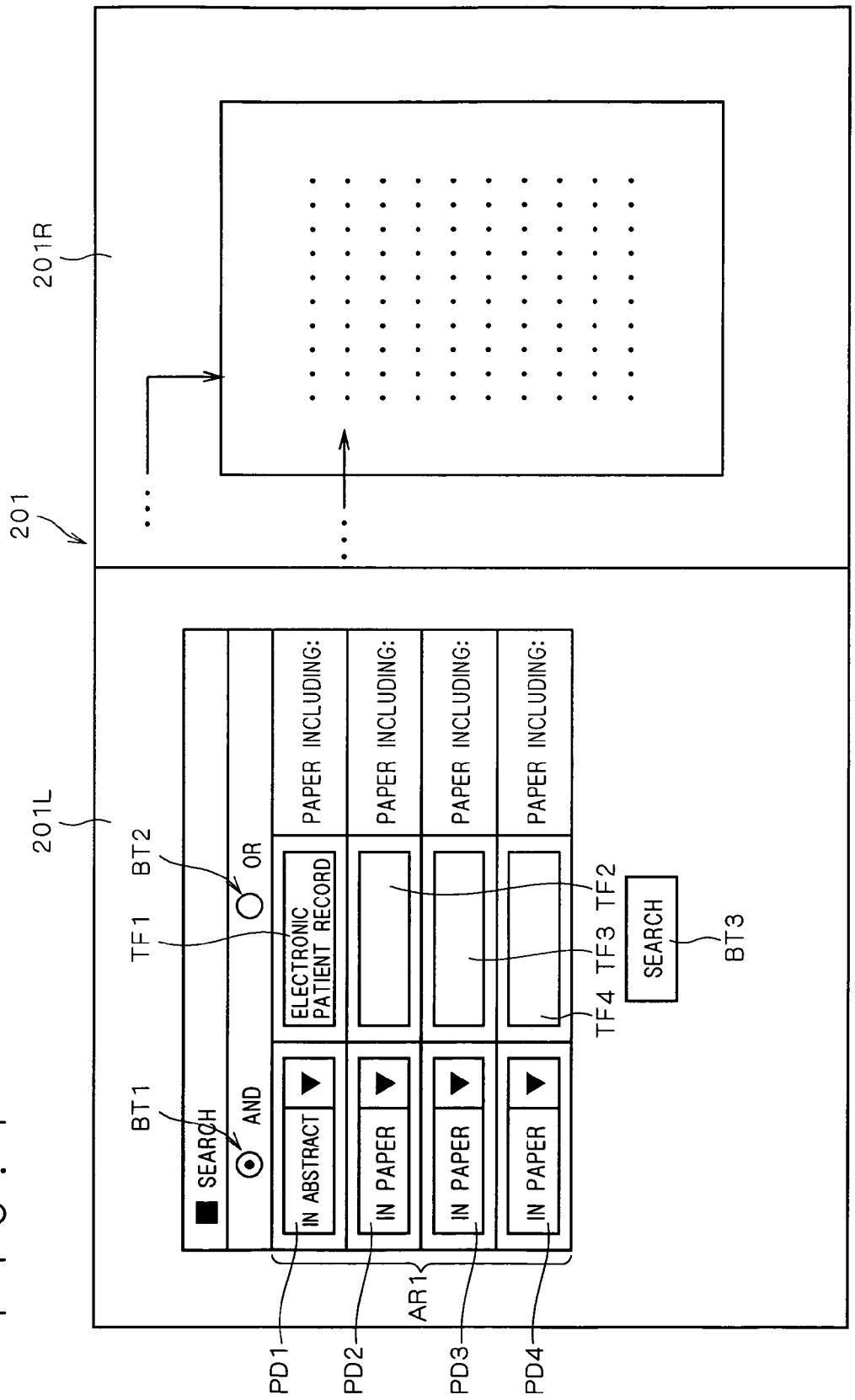
FIG. 7 is a diagram illustrating a search screen 201.

FIG. 7 is a diagram illustrating a search screen 201 for providing a search condition input function to the user. The search screen 201 is a composite screen constructed by a help screen 201R on the right side and a search condition input screen 201L on the left side. Such a composite screen is realized by defining a frame in an HTML document. The list display screen, detailed information selection display screen, detailed search screen, and detailed search result display screen which will be described later are constructed in a manner similar to the search screen 201.

The search condition input screen 201L has a search condition input assisting function. On the search condition input screen 201L, search condition selection buttons BT1 and BT2 are displayed. The search condition selection buttons BT1 and BT2 are alternatively selectable radio buttons. When the search condition selection button BT1 is selected, the information retrieval system 1 generates a search condition by AND of a plurality of individual search conditions (which will be described later). On the other hand, when the search condition selection button BT2 is selected, the information retrieval system 1 generates a search condition by OR of a plurality of individual search conditions.

Below the search condition selection buttons BT1 and BT2, a search condition input area AR1 is displayed. In the search condition input area AR1, pull-down menus PD1 to PD4 for inputting an individual search condition are provided. In each of the pull-down menus PD1 to PD4, one of options such as "in paper", "in title", "in author", "in keyword", "in abstract", and "in text" can be selected. Each option corresponds to a search range in the range designation search. Specifically, in the information retrieval system 1, when the options of "in paper", "in title", "in author", "in keyword", "in abstract", and "in text" are selected in the pull-down menus PD1 to PD4, a whole paper, the title field in the paper, the author field in the paper, a keyword field in the paper, the abstract field in the paper, and the text field in the paper are designated as search ranges. In other words, in the information retrieval system 1, when the options of "in paper", "in title", "in author", "in keyword", "in abstract", and "in text" are selected in the pull-down menus PD1 to PD4, all of elements of the XML document X2 and the elements E23, E26, E24, E22, and E25 are to be searched.

On the right side of the pull-down menus PD1 to PD4, text fields TF1 to TF4 are displayed, respectively. In each of the text fields TF1 to TF4, an arbitrary character string can be input. The user can generate an individual search condition by selecting an option in a pull-down menu and entering a character string in the text field on the right side of the pull-down menu. For example, when the option "in abstract" is selected in the pull-down menu PD1 and "electronic medical record" is input in the text field TF1, an individual search condition of "paper in which electronic medical record is included in abstract" is generated. In the search condition input screen 201L of FIG. 7, four individual search conditions can be generated.

Figure 16:
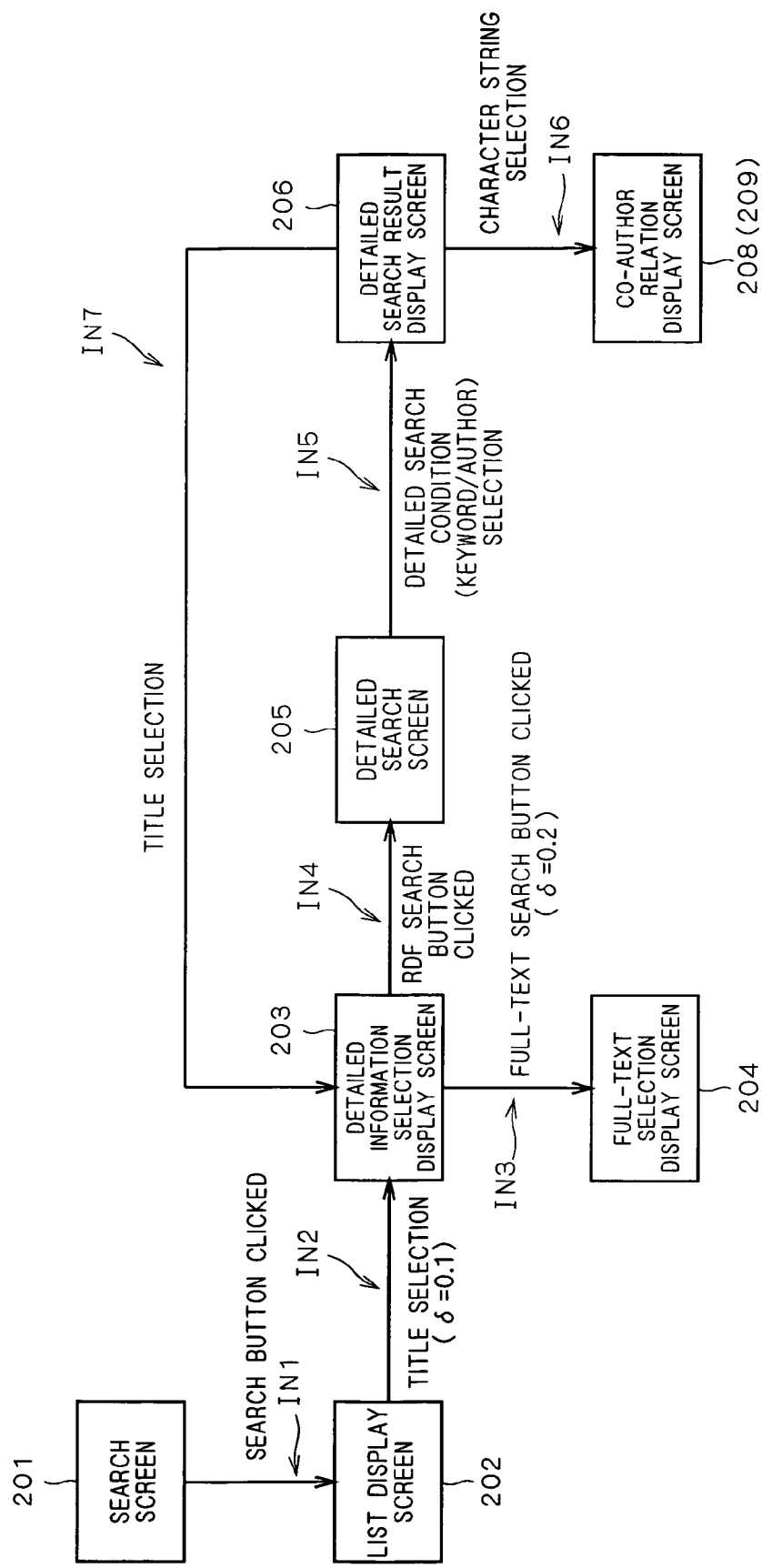
FIG. 16 is a diagram showing transition between GUI screens.

Below the search condition input area AR1, a search button BT3 is displayed. When click of the search button BT3 is detected, the information retrieval system 1 generates a search condition from the individual search condition and starts a searching process. After that, the screen displayed on the display 233 is changed from the search screen 201 to a list display screen 202 which will be described below (refer to screen transition of FIG. 16). The search button BT3 is consequently a GUI member in which a transition link for giving an instruction IN1 of screen transition from the search screen 201 to the list display screen 202 to the information retrieval system 1 is embedded.

The help screen 201R is used for explaining a method of using the information retrieval system 1.

List Display Screen

FIG. 8 is a diagram showing the list display screen 202 displaying a list of search results extracted by a searching process using the search condition entered in the search screen 201 by the user. The list display screen 202 is a composite screen constructed by a blank 202R on the right side and a search result list display screen 202L on the left side. The blank is used for displaying various information of selected paper data on various GUI screens which will be described later.

On the search result list display screen 202L, a search result general display table TA11 is displayed. In the search result general display table TA11, both of a full-text search result and a range designation search result are integrally displayed in a list. Specifically, in the search result general display table TA11, a list of sum-sets of the full-text search result and the range designation search result is displayed. Viewing of only the full-text search result or the range designation search result is realized by clicking a range designation limit button BT11 or a range designation cancel button BT12, respectively.

In each of the second and subsequent rows in the search result general display table TA11, a title display cell CE11, a coincidence display cell CE12, and a search method display cell CE 13 are provided.

In the title display cell CE11, the title of a paper related to the paper data extracted by the searching process is displayed. A hyperlink is embedded in the title. The hyperlink is a transition link for giving a screen transition instruction IN2 to detailed information selection display screen 202 of a paper having the title in which the hyperlink is embedded. The user can select paper data having the title by performing GUI operation for selecting the hyperlink embedded in the title. The paper data selected in such a manner will be also referred to as "selected paper data".

In the coincidence display cell CE12, general coincidence C calculated on the basis of the coincidence C1 and C2 is displayed. The coincidence C is obtained by adding the coincidence C1 and C2 with predetermined weighting ($C=\alpha C1+\beta C2$ where $\alpha$ and $\beta$ are constants). Since the intention of the search of the user is reflected more faithfully in the range designation search result, it is desirable to set contribution of the coincidence C2 in the coincidence C to be larger relative to that of the coincidence C1. In such a manner, the relatively larger coincidence C can be given to a paper adapted to the user's search intention.

In the search method display cell CE13, the character string of "full-text search" and/or the character string of "range designation search" are/is displayed. The "full-text search" denotes a paper included in the full-text search result, and the "range designation search" denotes a paper included in the range designation search result.

In the search result general display table TA11, extracted paper data is sorted and displayed in descending order of the coincidence C.

Detailed Information Selection Display Screen

Figure 9:
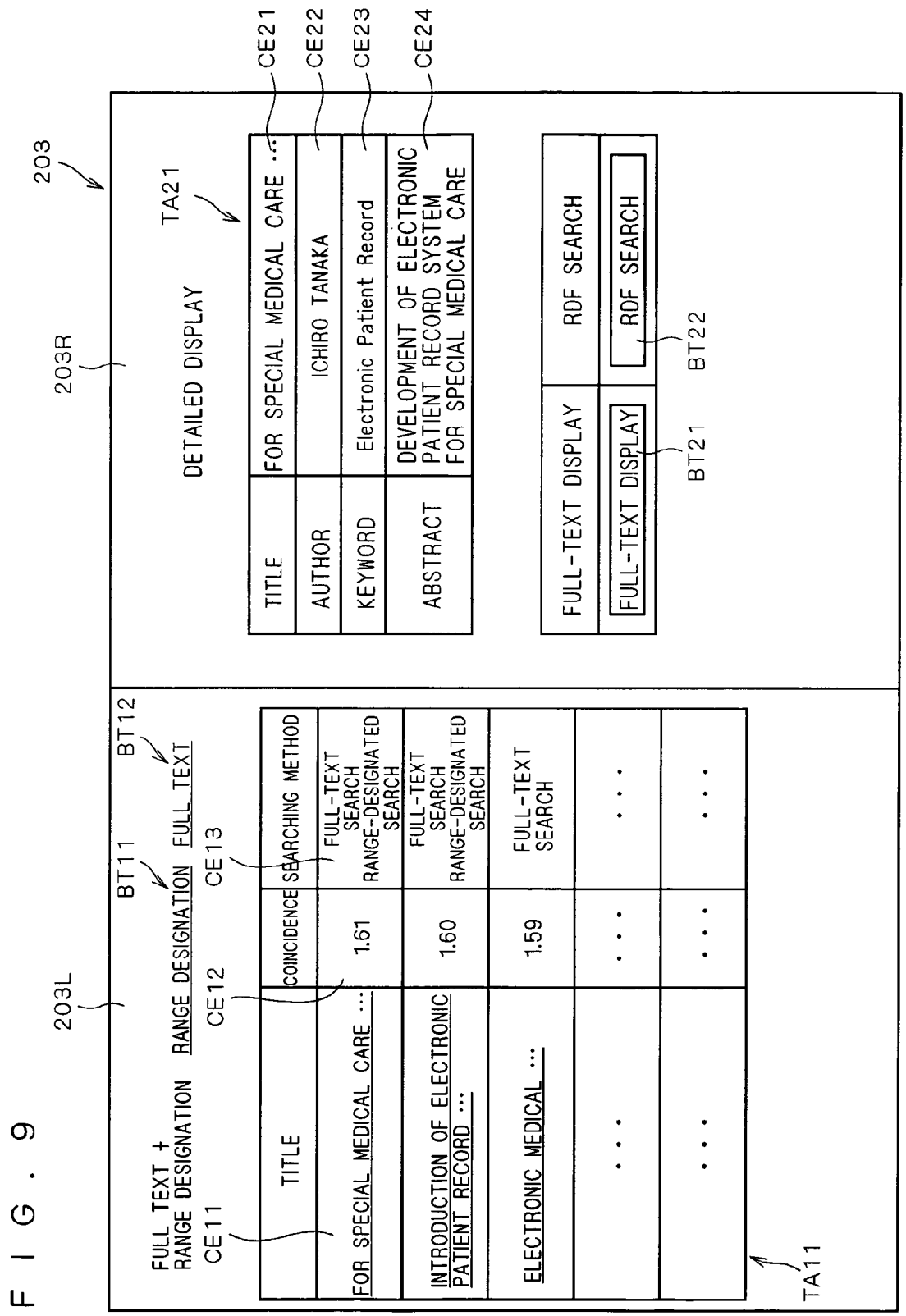
FIG. 9 is a diagram illustrating a detailed information selection display screen 203.

FIG. 9 is a diagram showing a detailed information selection display screen 203 displaying information including more-detailed information of the selected paper data which is selected by the user from the list of search results displayed on the list display screen 202. The detailed information selection display screen 203 is a composite screen constructed by a detailed information display screen 203R on the right side and a search result list display screen 203L on the left side.

The configuration of the search result list display screen 203L is similar to the search result list display screen 202L of the list display screen 202. Consequently, in the search result list display screen 203L of FIG. 9, reference numerals similar to those of the search result list display screen 202L are used.

A detailed display table TA21 is displayed in the detail information display screen 203R. In the detailed display table TA21, a title display cell CE21, an author display cell CE22, a keyword display cell CE23, and an abstract display cell CE24 for displaying the title, author, keyword, and abstract, respectively, as bibliographical information of the paper, included in the selected paper data are provided. The paper whose bibliographical information is displayed in the detailed display table TA21 is the paper related to the selected paper data selected by the user on the list display screen 202 before the screen transition.

Below the detailed display table TA21, a full-text display button BT21 and an RDF search button BT22 are displayed. The full-text display button BT21 is a transition link for giving a screen transition instruction IN3 to a full-text individual display screen 204 of the paper whose bibliographical information is displayed in the detailed display table TA21. The RDF search button BT22 is a transition link for giving a screen transition instruction IN4 to a detailed search screen 205 to the information retrieval system 1. Therefore, in the information retrieval system 1, in response to click of the full-text display button BT21 or RDF search button BT22, the screen displayed on the display 233 is changed from the detailed information selection display screen 203 to the full-text selection display screen 204 or detailed search screen 205.

Full-Text Selection Display Screen

FIG. 10 is a diagram illustrating the full-text selection display screen 204 displaying more-detailed information of the selected paper data which is selected by the user from the adapted paper data group displayed in the list display screen 202.

In the full-text selection display screen 204, the full text of the paper whose bibliographical information is displayed in the detailed display table TA21 of the detailed information selection display screen 203 before the screen transition. On both of the detailed information selection display screen 203 and the full-text selection display screen 204 (hereinafter, which will be also collectively referred to as "selected display screen group"), information which is detailed more than the information presented on the list display screen 202 of the selected paper data is presented to the user. In the selected display screen group, information presented on the full-text selection display screen 204 is more detailed than that on the detailed information selection display screen 203. By changing detailedness of information to be presented to the user in the selection display screen group, information the user desires to browse can be specified from the screen transition instruction. That is, by employing a screen group in which the information disclosure level changes hierarchically, the intention of the user to the retrieval result can be estimated.

Although the example in which the selection display screen group includes two GUI screens has been described in the preferred embodiment, a larger number of GUI screens in which the information disclosure levels are hierarchically different from each other may be included.

Detailed Search Screen

Figure 11:
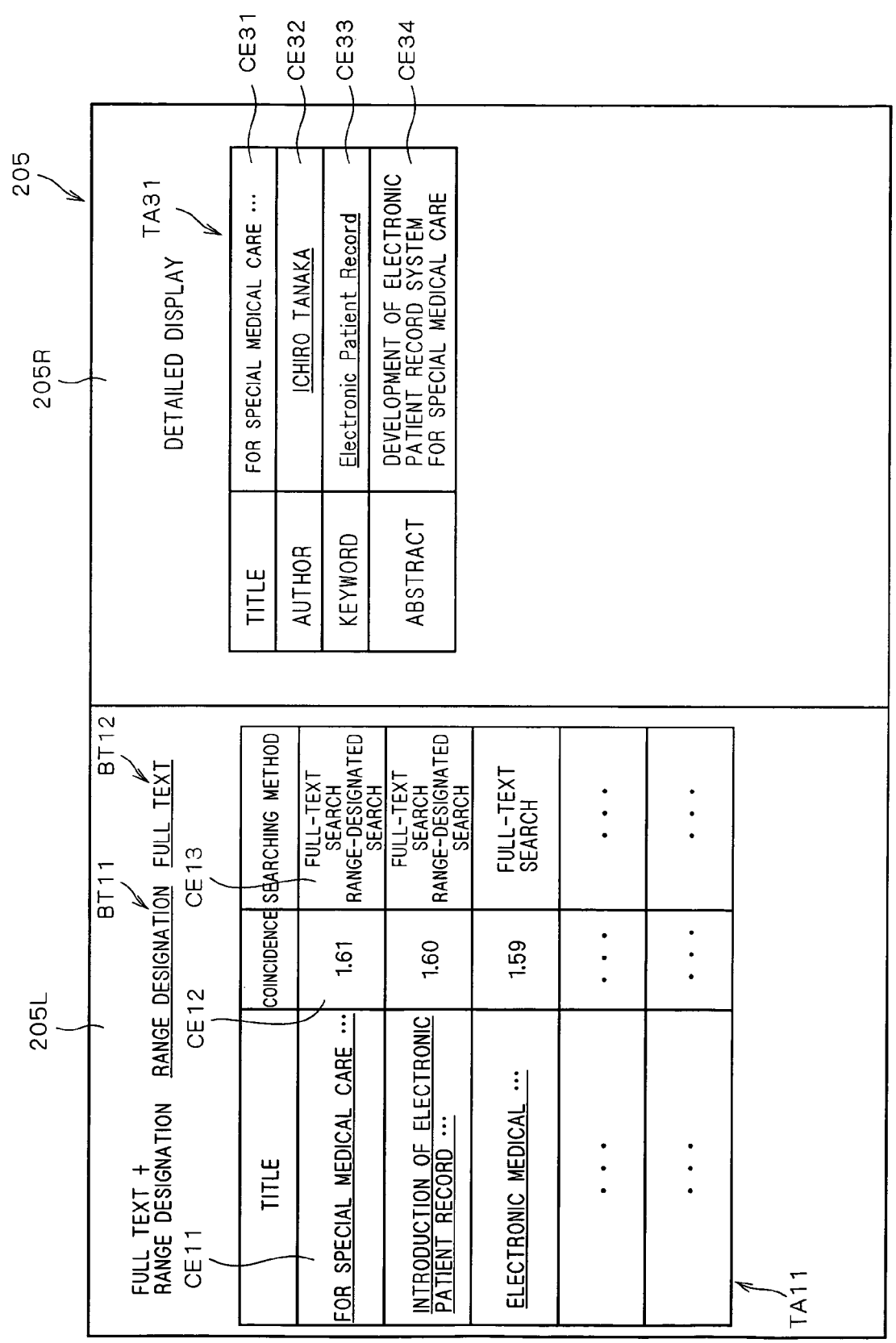
FIG. 11 is a diagram illustrating a detailed search screen 205.

FIG. 11 is a diagram illustrating the detailed search screen 205 for providing the function of selecting the detail search condition. The detailed search screen 205 is a composite screen constructed by an RDF search screen 205R on the right side and a search result list display screen 205L on the left side.

The configuration of the search result list display screen 205L is similar to the search result list display screen 202L of the list display screen 202. Consequently, in the search result list display screen 205L of FIG. 11, reference numerals similar to those of the search result list display screen 202L are used.

In the RDF search screen 205R, a detailed display table TA31 including a title display cell CE31, an author display cell CE32, a keyword display cell CE33, and an abstract display cell CE34 similar to those of the detailed display table TA21 is displayed. The displayed data in the detailed display table TA31 is similar to that of the detailed display table TA21 in the detailed information selection display screen 203. In the detailed display table TA31, different from the detailed display table TA21, a hyperlink is embedded in the author ("Ichiro Tanaka" in FIG. 11) and the keyword ("Electronic Patent Record" in FIG. 11). The hyperlink is a transition link for giving a screen transition instruction IN5 to a detailed search result display screen 206 to the information retrieval system 1. Therefore, when the hyperlink as an option is selected (clicked) in the detailed search screen 205, the information retrieval system 1 executes a searching process using the author or keyword in which the hyperlink is embedded as a detailed search condition, and displays a list of search results on the detailed search result display screen 206 which will be described next. The option is extracted from information (author and keyword) displayed on the detailed information selection display screen 203. Since it becomes easier to give the author and keyword displayed on the detailed information selection and display screen 203 as detailed search conditions to the information retrieval system 1, information related to selected paper data can be easily obtained.

Detailed Search Result Display Screen

Figure 12:
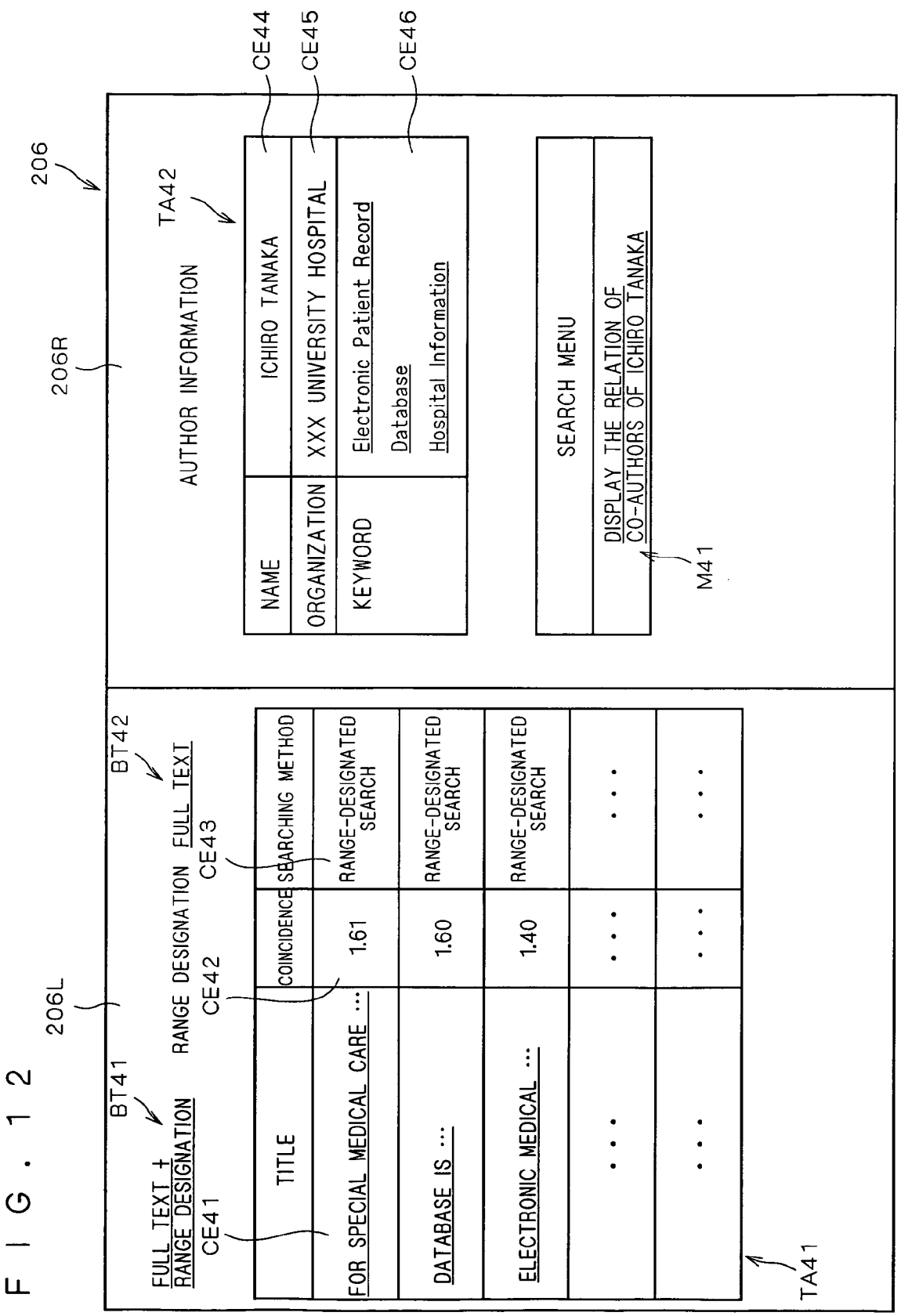
FIG. 12 is a diagram illustrating a detailed search result display screen 206.

FIG. 12 is a diagram illustrating the detailed search result display screen 206 displaying a list of search results obtained by the searching process using the detailed search conditions. FIG. 12 illustrates the detailed search result display screen 206 displayed in the case where the transition link embedded in the author "Ichiro Tanaka" is selected in the detailed search screen 205. The detailed search result display screen 206 is a composite screen constructed by an author information display screen 206R on the right side and a search result list display screen 206L on the left side.

On the search result list display screen 206L, a range-limited search result display table TA41 is displayed. In the range-limited search result display table TA41, a list of range-designated search results using, as a range-designated search keyword, the author "Ichiro Tanaka" in which the transition link selected on the detailed search screen 205 before the screen transition is embedded is displayed. Browsing of integrated display of the full-text search result and the range-designated search result is realized by click on an integrated display button BT41. Display of only the full-text search result is realized by click on a range designation cancel button BT42.

In the second and subsequent rows in the range-limited search result display table TA41, a title display cell CE41, a coincidence display cell CE42, and a search method display cell CE43 are provided.

In the title display cell CE41, the title of a paper related to the paper data extracted by the searching process is displayed. A hyperlink is embedded in the title. The hyperlink is a transition link for giving a screen transition instruction IN7 to detailed information selection display screen 202 of a paper having the title in which the hyperlink is embedded. The user can select paper data having the title by performing GUI operation for selecting the hyperlink embedded in the title.

In the coincidence display cell CE42, the coincidence C2 is displayed. In the search method display cell CE43, a character string of "range-designated search" indicative of a paper included in a range-designated search result is displayed. In the search result general display table TA11, extracted paper data is sorted and displayed in the descending order of the coincidence C2.

On the author information display screen 206R, an author information display table TA42 is displayed. The author information display table TA42 includes an author display cell CE44, an organization display cell CE45, and a keyword display cell CE46 for displaying the author, the organization to which the author belongs, and keywords used for the paper of the author, respectively. The author displayed in the author display cell CE44 is the author in which the transition link selected by the detailed search screen 205 before the screen transition is embedded.

Further, before the author information display table TA42, a character string M41 ("display the relation of co-authors of Ichiro Tanaka") is displayed as a search menu. A hyperlink is embedded in the character string M41. The hyperlink is a transition link for giving a screen transition instruction IN6 to a co-author relation display screen 208 (209) which will be described next to the information retrieval system 1.

Co-Author Relation Display screen

Figure 13:
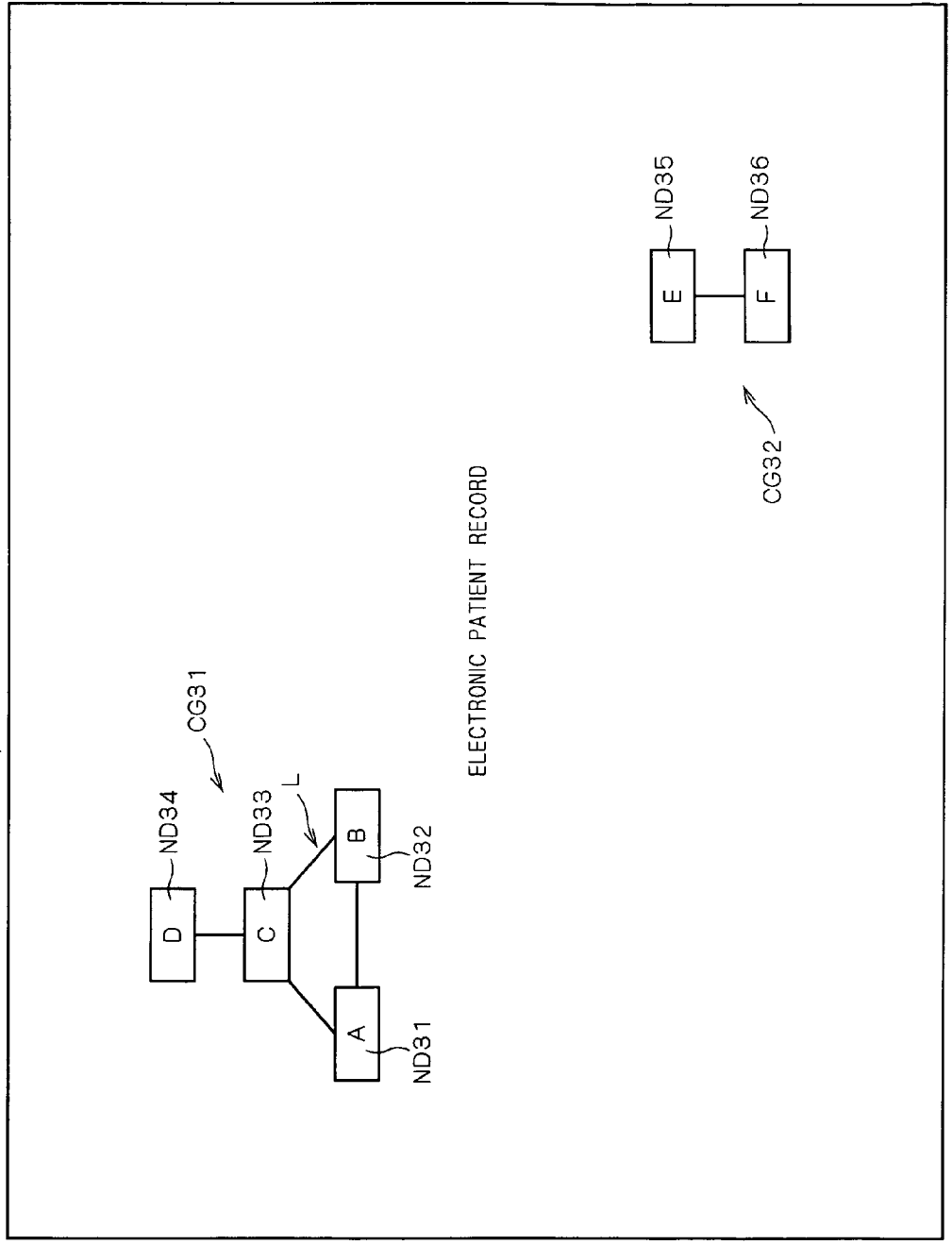
FIG. 13 is a diagram illustrating a co-author relation display screen 208.
Figure 14:
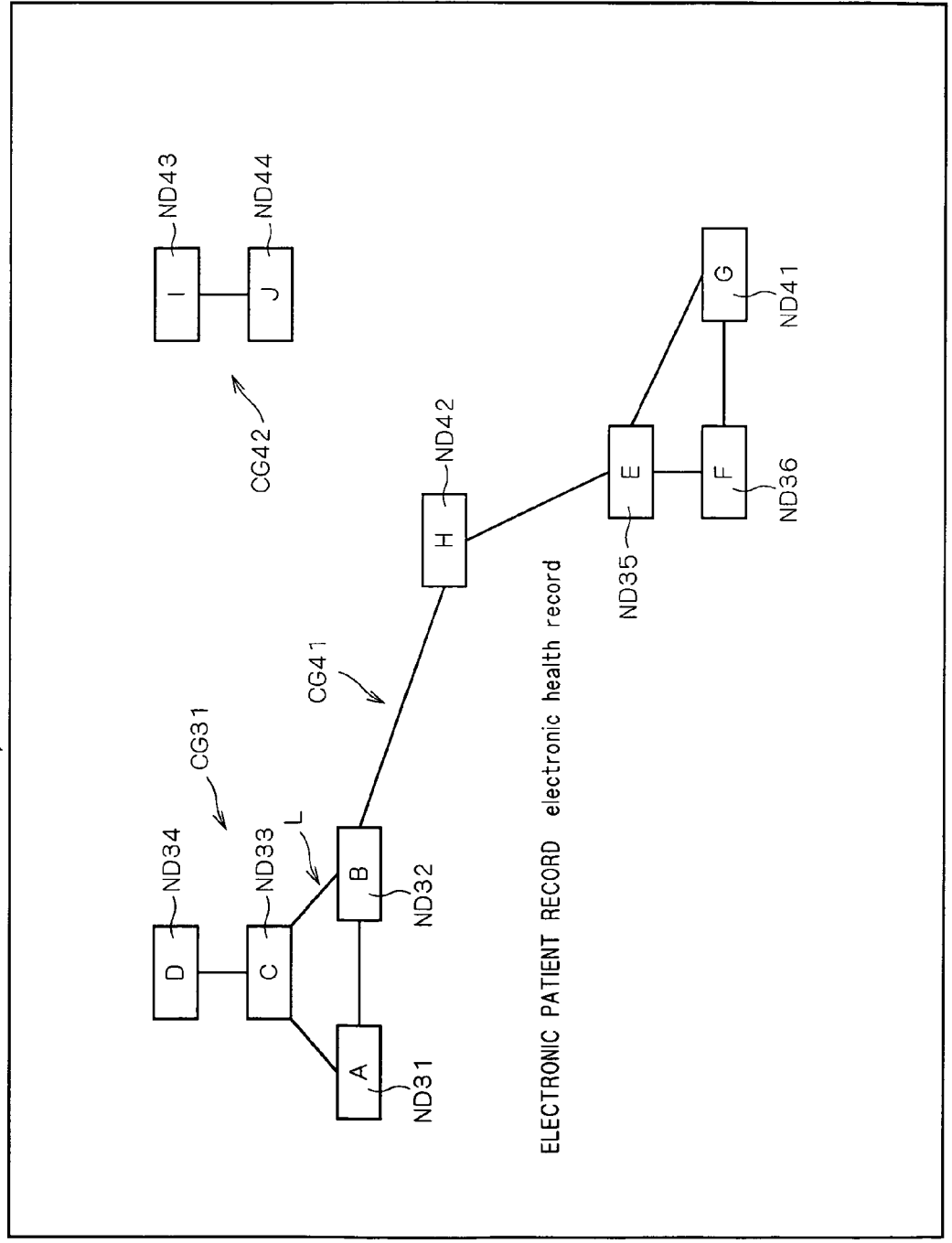
FIG. 14 is a diagram illustrating a co-author relation display screen 209.

FIGS. 13 and 14 are diagrams illustrating the co-author relation display screens 208 and 209 displaying the co-author relation. The co-author relation display screens 208 and 209 are displayed when search keywords "electronic medical record" and "electronic health record" are used, respectively.

On the co-author relation display screen 208, authors A, B, C, D, E, and F are displayed as nodes ND31, ND 32, ND33, ND34, ND35, and ND36, respectively. The nodes corresponding to the co-authors of the extracted paper are connected to each other via line segments L. By such a display, the user can recognize the co-author relations without conscious deductive effort. On the co-author relation display screen 208, two co-author groups CG31 and CG32 are displayed.

Similarly, on the co-author relation display screen 209, in addition to the nodes ND31 to ND36 displayed on the co-author relation display screen 208, nodes ND41, ND42, ND43, and ND44 corresponding to authors G, H, I, and J, respectively, are displayed. On the co-author relation display screen 209, the co-author groups CG31 and CG32 separated from each other on the co-author relation display screen 208 are connected to each other via a node ND42 corresponding to the author H, thereby forming one co-author group CG41. On the co-author relation display screen 209, a new co-author group CG42 which is not included in the co-author relation display screen 208 is displayed.

By such a co-author relation display screen, a change in the co-author relations in association with a change in the keyword can be easily recognized and a large amount of the co-author relation information can be obtained.

Popup Screen

Figure 15:
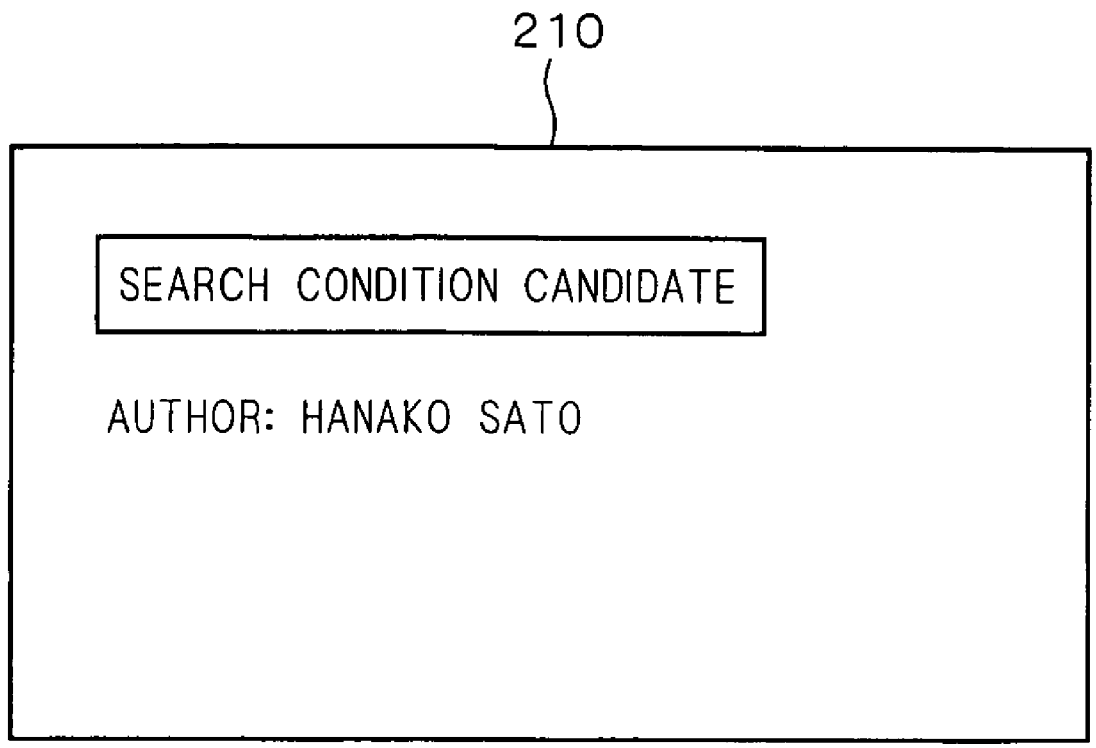
FIG. 15 is a diagram illustrating a pop-up screen 210.

FIG. 15 is a diagram illustrating a popup screen 210 for presenting auxiliary information (replacement/addition candidate for a search condition) for assisting a change in a search condition by the user to the user when the user enters a search condition on the search screen 201. FIG. 15 illustrates the case where the author "Hanako Sato" is displayed as auxiliary information. Auxiliary information other than an author such as a keyword can be also displayed on the popup screen (which will be described later).

A search condition candidate presented as auxiliary information to the user on the popup screen 210 is a keyword or an author having a strong relation with the search condition entered by the user. The information of the keyword or the author is generated by using detailed search information R2 stored in the search history storage 215.

Operation

Update and Use of Selected Paper Information

In the following, a method of updating the selected paper information R1 will be described first. After that, a method of using the selected paper information R1 in a searching process and a screen generating process will be described.

FIG. 17 is a diagram for explaining a method of updating the selected paper information R1. A table TA61 of FIG. 17 shows a concrete example of the selected paper information R1 at a specific time point. The information retrieval system 1 employs, as the selected paper information R1, information in which:

(1) a search condition Xi;

(2) selected paper data Yi selected by the user from search results extracted by a searching process using the search condition Xi; and (3) a score given to the set of the search condition Xi and the selected paper data Yi, are associated with each other.

The score is a parameter indicative of the strength of the relation between the search condition Xi and the selected paper data Yi.

In the case where the selected paper information R1 is given in the table TA61, when the user makes the information retrieval system 1 execute a searching process using the search condition Xi already included in the table TA61 and selects the paper data Yi from search results on the list display screen 202 (screen transition instruction IN2), the table TA61 is updated to a table TA62. In the table TA62, the score given to the set of the search condition Xi and the selected logic data Yi is increased as compared with that in the table TA61 only by δ. It means that the selected paper information R1 is updated on the basis of the screen transition instruction given from the user.

On the other hand, in the case where the selected paper information R1 is given in the table TA61, when the user makes the information retrieval system 1 execute a searching process using a search condition Xn+1 which is not included in the table TA61 and selects paper data Yn+1 from search results on the list display screen 202 (screen transition instruction IN2), the table TA61 is updated to a table TA63. In the table TA63, different from the table TA61, a score δ is given to a new set of the search condition Xn+1 and the selected logic data Yn+1. In such a manner as well, the selected paper information R1 is updated on the basis of the screen transition instruction given from the user.

In the information retrieval system 1, the increment δ of the score changes according to a screen viewed by the user. For example, in the case where the user makes the detailed information selection display screen 203 displayed on the display 233 by the screen transition instruction IN2, δ is set to 0.1. In the case where the full-text selection display screen 204 is displayed on the display 233 by the screen transition instruction IN3 subsequent to the screen transition instruction IN2, δ is set to 0.2. By changing the increment of the score with the screen transition instruction, the selected paper information R1 is updated on the basis of the disclosure level of the presented information or the hierarchy of the GUI screen, so that the search condition and the selected paper data are related to each other more reliably. Since the screen transition instruction denotes also expression of the user' intention to the search result, the intention of the user to the search result is reflected in the selected paper information R1. Therefore, by holding the selected paper information R1 in the information retrieval system 1, the expression of the user's intention in the past can be used.

By the updating of the selected paper information R1, when the user repeats selection of paper data Yj from search results extracted by the search process using the search condition Xj, a high score is given to the set of the search condition Xj and the selected paper data Yj. Consequently, in the case where there is the search condition Xj and the selected paper data Yj to which a high score is given and a searching process using the search condition Xj is performed newly, the possibility that the user selects the paper data Yj again from search results is high. In the information retrieval system 1, such a characteristic of the selected paper information R1 is used for the searching process and the screen generating process. Consequently, in the information retrieval system 1, the intention of the user is reflected in the searching process and the screen generating process.

More concretely, when the user makes the information retrieval system 1 execute a searching process using a new search condition Xj, the search engine group 210 refers to the selected paper information R1 stored in the search history storage 215 and determines whether a set of a search condition Xj' which is the same as or similar to the search condition Xj and selected paper data Yj' exists or not. If the set exists, a score Sj given to the set (or scores given to a plurality of such sets) and the selected paper data Yj' is read, and the score Sj is added to the coincidence C of the selected paper data Yj included in the search result. Since the search results are sorted in the decreasing order of the coincidence C in the search result general display table TA11 of the list display screen 202, by the addition of the score Sj, the order of the selected paper data Yj' is increased in the list and the information of the list changes. Therefore, more detailed information of the paper data Yj which is selected by the user with high possibility can be browsed more easily.

In place of addition of the score Sj to the coincidence C, the selected paper information R1 may be used for the screen generating process in the HTML document generator 211. For example, by a variation in the display method such as a variation in the character color or font of paper data having a predetermined score or higher, browse of paper data selected in the past may be facilitated. Although the case where only one piece of the selected paper information R1 is held has been described, alternately, the search history storage 215 may be provided for each user or each user group and the selected paper information R1 may be held in each user or user group. With the configuration, the intention of each user or user group can be reflected in the searching process and the screen generating process.

Update and Use of Detailed Search Information

In the following, a method of updating the detailed search information R2 will be described first. After that, a method of using the detailed search information R2 in a searching process and a screen generating process will be described.

FIGS. 18A and 18B are diagrams for explaining the detailed search information R2. A table TA71 of FIG. 18A shows information of the relation between a search condition and a keyword in the detailed search information R2 at a specific time point. A table TA72 of FIG. 18B shows information of the relation between a search condition and an author in the detailed search information R2 at a specific time point. The information retrieval system 1 employs, as the detailed search information R2, information in which:

(1) a search condition Xi; and (2) a keyword KWi or an author AUi of an option selected on the detailed search screen 205 of the selected paper data selected by the user from search results extracted by a searching process using the search condition Xi are associated with each other. The detailed search information R2 is updated only in the case where a paper is selected (a screen transition instruction IN7 is given) on the search result list display screen 206L of the detailed search result display screen 206. Consequently, only when the user makes a detailed search (screen transition instruction IN5) and wishes to browse detailed information of individual paper data from search results, the detailed search information R2 is updated. By holding the detailed search information R2 in the information retrieval system 1, expression of intention of the user in the past can be used and, when a new search condition is given, an author or keyword having a strong relation to the search condition is specified and the information can be used.

More concretely, when the user makes the information retrieval system 1 execute a searching process using a new search condition Xk, the HTML document generator 211 refers to the detailed search information R2 stored in the search history storage 215 and determines whether a set of a search condition Xj' which is the same as or similar to the search condition Xj and a keyword KWj' or an author AUj' exists or not. If the set exists, the keyword KWj' or author AUj' is read, and the popup screen 210 using the read keyword KWj' or author AUj' as search condition candidates is generated and output. Consequently, the user can know in advance the detailed search condition used for a detailed search which is executed by the user later with high possibility.

Modifications

Selected Paper Information

Figure 19:
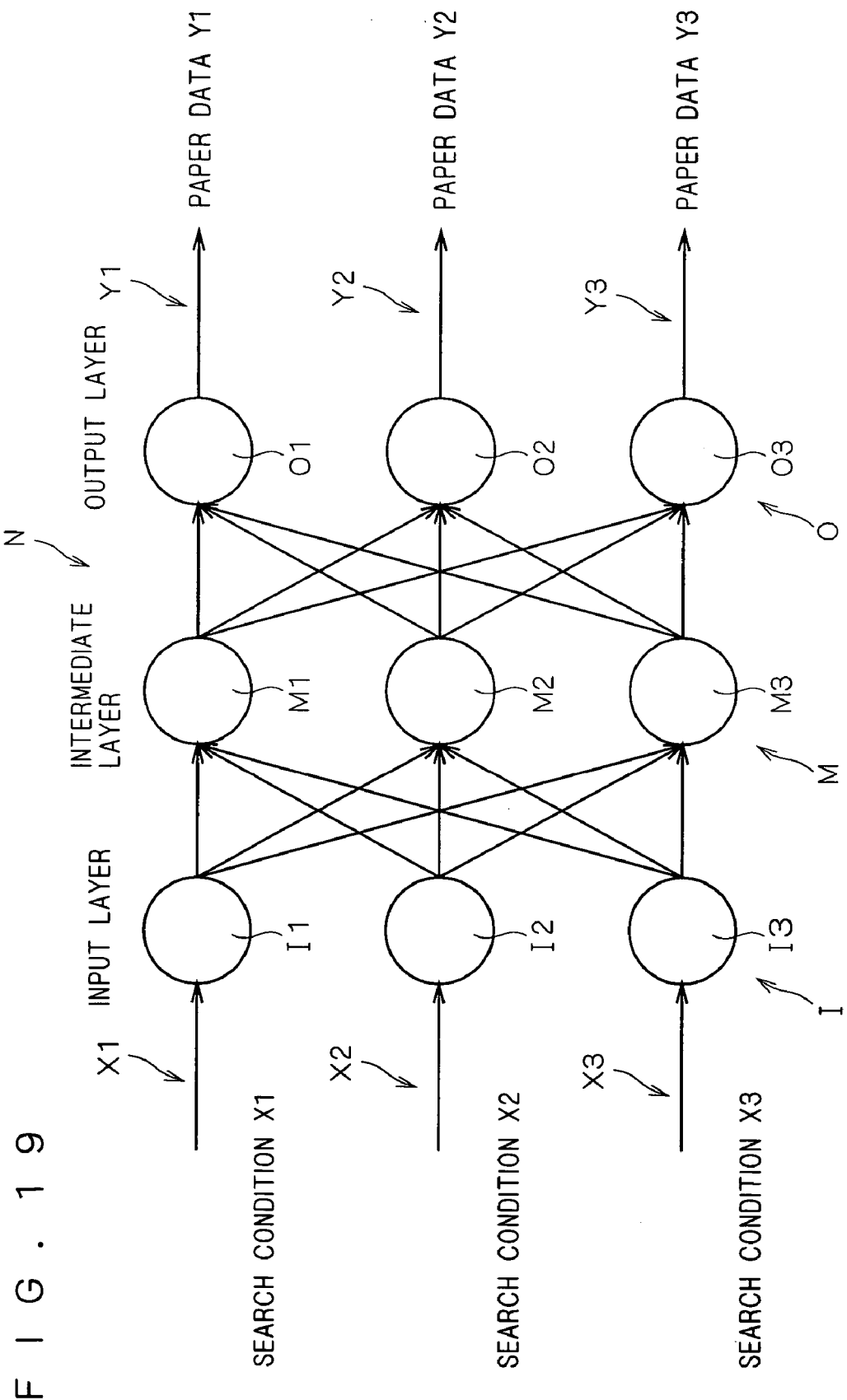
FIG. 19 is a diagram showing a neural network N.

The selected paper information R1 is not limited to the form in the foregoing preferred embodiment but may take the form of a neural network. FIG. 19 is a diagram schematically showing a neural network. Although FIG. 19 shows a neural network having three input neurons and three output neurons for convenience of explanation, the present invention is not limited to the number of input neurons and that of output neurons.

A neural network N is a perceptron constructed by three layers of an input layer I, an intermediate layer M, and an output layer O each having three neurons. In this case, search conditions X1, X2, and X3 are associated with inputs X1, X2, and X3, respectively. Similarly, selected paper data Y1, Y2, and Y3 is associated with outputs Y1, Y2, and Y3, respectively. The inputs (X1, X2, and X3) are input to neurons 11, 12, and 13 in the input layer, respectively. Outputs of each of the neurons 11, 12, and 13 are input to all of neurons M1, M2, and M3 in the intermediate layer. Subsequently, outputs of the neurons M1, M2, and M3 are input to all of neurons O1, O2, and O3 in the output layer. Outputs of the neurons O1, O2, and O3 are the outputs Y1, Y2, and Y3, respectively.

In the neural network N, when the searching process using the search condition Xj (j=1, 2, 3) is executed and the user selects selected paper data Yk (k=1, 2, 3), the selected paper information R1 may be updated by making the neural network learn and strengthen the connection between the search condition Xj and the selected paper data Yk. At this time, by making the learning progressed in the case where the screen transition instruction IN3 is given faster than the case where the screen transition instruction IN2 is given, effects similar to those of the foregoing preferred embodiment can be obtained.

Data Format of Paper Data Group

Although the case where the data format of the paper data group is a document with a tag described in the XML has been described in the foregoing preferred embodiment, SGML (Standard Generalized Markup Language), XML, HTML, XHTML (eXtensible HyperText Markup Language), RDF, or the like may be employed as a description language.

Structure of Database

As the structure of the database 214, any of a relational structure, a structure in which a document described in any of the description languages is stored in relational form, and a native XML structure can be employed.

While the invention has been shown and described in detail, the foregoing description is in all aspects illustrative and not restrictive. It is therefore understood that numerous modifications and variations can be devised without departing from the scope of the invention.

What is claimed is:

1. An information retrieval system for providing information to a user, comprising:
 a computing device operatively coupled to a database;
 the computing device further including:
  a searching part configured to extract a matched data group satisfying a search condition from a data group to be searched;
  a screen generator configured to generate a list display screen for displaying a list of information of the matched data group extracted by said searching part using, as said search condition, a first search condition entered by the user, and configured to generate a plurality of selection display screen groups displaying information including detailed information of data selected by the user from said matched data group;

the screen generator configured to display a first selection display screen corresponding to first information included in said selected data, and the first selection display screen prompts the user to select a second search condition;

the screen generator configured to display a second selection display screen corresponding to second information, which provides greater detail than is included in said first information and corresponds to said selected data;

a storage portion configured to store first relation information as information of the relation between said first search condition and said selected data, wherein a screen to be displayed on said display is switched among said list display screen and said plurality of selection display screen groups in response to a screen transition instruction given from the user, said screen transition instruction providing an indication of the user's level of satisfaction regarding desired search results;

said first relation information is updated in response to said screen transition instruction to strengthen a relation between the first search condition and the selected data for a next search session in which said first searching condition is designated by the user again, and wherein the strengthened relation is assigned to said next search session whereby said list display screen in the next search session is generated in response to the strengthened relation.

2. The information retrieval system according to claim 1, wherein said plurality of selection display screen groups include a first selection display screen for displaying first information included in said selected data, and a second selection display screen for displaying second information which provides greater detail than is included in said first information, included in said selected data, and a screen to be displayed on said display is changed from said first selection display screen to said second selection display screen in response to a predetermined first screen transition instruction.

3. The information retrieval system according to claim 2, wherein said first information is bibliographical information of said selected data, and said second information is text of said selected data.

4. The information retrieval system according to claim 1, wherein said screen generator is further configured to generate a detailed search screen for prompting the user to select a second search condition for a detailed search from options;

a screen to be displayed on said display is changed from a predetermined selection display screen included in said selection display screen group, to said detailed search screen in response to a predetermined second screen transition instruction; and said option is extracted from information displayed on said predetermined selection display screen.

5. The information retrieval system according to claim 4, wherein information displayed on said predetermined selection display screen is bibliographical information of said selected data.

6. The information retrieval system according to claim 1, wherein said first relation information stored in said storage is used for said searching process or said screen generating process.

7. The information retrieval system according to claim 6, wherein information displayed on said list display screen or a displaying method changes by the use of said first relation information in said searching process or said screen generating process.

8. The information retrieval system according to claim 1, wherein said storage is provided for each user or each user group.

9. The information retrieval system according to claim 4, wherein said storage stores second relation information as information of the relation between said first search condition and said second search condition, said screen generator further configured to generate a detailed search result display screen for displaying information of a second match data group extracted by said searching process using, as said search condition, said second search condition selected by the user on said detailed search screen, and said second relation information is updated on the basis of a predetermined second screen transition instruction in said detailed search result display screen.

10. The information retrieval system according to claim 9, wherein information which can be selected as said second search condition is an author or a keyword of said selected data.

11. The information retrieval system according to claim 1, wherein resource description framework (RDF) is used for expressing said data group to be searched.

12. The information retrieval system according to claim 1, wherein each piece of said data group to be searched is data obtained by converting a document in a fixed form including predetermined items into an electronic form.

13. An information retrieval system for providing information to a user, comprising:

a computing device in communication with a database;

the computing device further including:

a searching part configured to extract a matched data group satisfying a search condition from a data group to be searched;

a screen generator configured to generate a list display screen for displaying a list of information of the matched data group extracted by said searching part using, as said search condition, a first search condition entered by the user, and configured to generate a plurality of selection display screen groups displaying information including detailed information of data selected by the user from said matched data group;

the screen generator configured to display a first selection display screen corresponding to first information included in said selected data, and the first selection display screen prompts the user to select a second search condition;

the screen generator configured to display a second selection display screen corresponding to second information, which provides greater detail than is included in said first information and corresponds to said selected data;

a storage portion configured to store first relation information as information of the relation between said first search condition and said selected data, wherein a screen to be displayed on said display is switched among said list display screen and said plurality of selection display screen groups in response to a screen transition instruction given from the user, said screen transition instruction providing an indication of a level of user satisfaction regarding desired search results, said first relation information is updated in response to said screen transition instruction to strengthen a relation between the first search condition and the selected data for use in said searching process or said screen generating process in a next search session in which said first searching condition is designated by the user again, and wherein the strengthened relation is assigned to said next search session whereby said list display screen in the next search session is generated in response to the strengthened relation.

14. A database system, comprising:

a database configured to store a data group of a predetermined category;

a first screen generator configured to generate a first screen to prompt a user to designate a searching condition;

a search engine configured to search said database to extract a plurality of data matching said searching condition among said data group;

a second screen generator configured to generate a second screen for displaying a list of hyperlinks to said plurality of data;

a manual selection tool manually operable by the user to arbitrarily select a target data among the list of hyperlinks to said plurality of data;

a third screen generator configured to generate a third screen displaying contents of said target data and further hyperlinks in response to a manual selection by the user using said manual selection tool and the list of hyperlinks; and a matching score controller configured to store respective matching scores of said plurality of data with said searching condition, and to increase the matching score of said target data for said searching condition in response to said manual selection, whereby said search engine is operable to extract said target data at a higher matching score, and said second screen generator is operable to generate said second screen in response to said higher matching scores when said searching condition is designated again for searching said database than previously designated, and wherein the increased matching score is assigned to said next search session whereby said list of hyperlinks in said next search session is generated in response to the increased matching score.

* * * * *